Dec. 21, 1954     J. T. BRUNNER     2,697,404
RERAILING FROG

Filed March 5, 1952     3 Sheets-Sheet 1

INVENTOR
JOHN T. BRUNNER

INVENTOR
JOHN T. BRUNNER

Dec. 21, 1954    J. T. BRUNNER    2,697,404
RERAILING FROG
Filed March 5, 1952    3 Sheets—Sheet 3
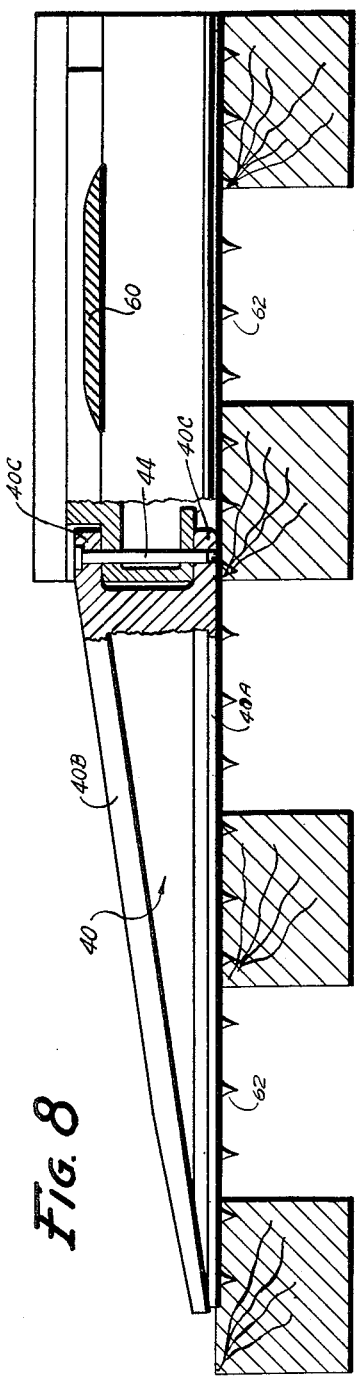
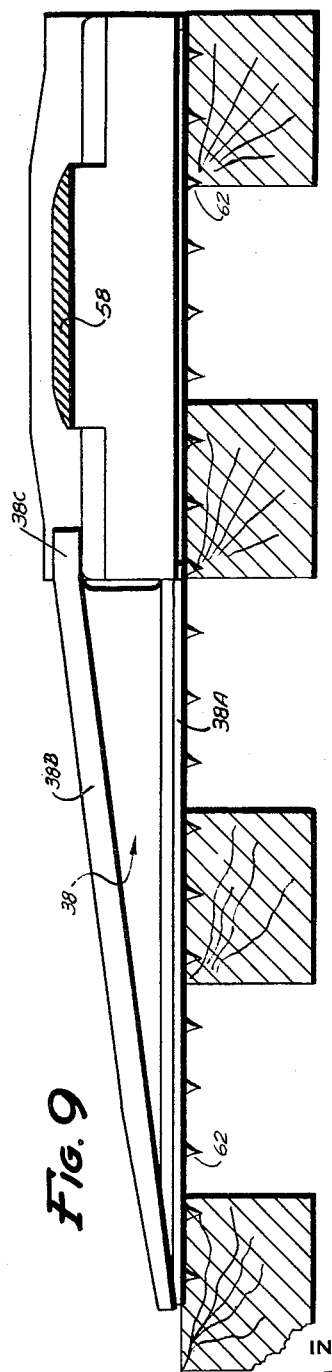
INVENTOR
JOHN T. BRUNNER
BY

United States Patent Office 2,697,404
Patented Dec. 21, 1954

2,697,404

RERAILING FROG

John T. Brunner, Memphis, Tenn.

Application March 5, 1952, Serial No. 274,893

3 Claims. (Cl. 104—265)

This invention relates to devices known as rerailing frogs, which are used in replacing on the track, railroad equipment, particularly engines or heavily loaded cars, which have been derailed and are still on wheels and adjacent to the rails.

It particularly relates to devices which employ cooperating structures each respectively adapted to be disposed between and exterior to the track rails, and engaging therewith, along which the wheel and axle units of engine or car trucks are successively pushed or pulled upward and toward the rails, raising the wheel between the rails above and shifting the wheel tread over to ride on the rail, and concurrently raising and shifting the wheel outside the rails to ride over and drop its tread on the rail.

Rerailing of present day equipment involves handling of loads of the nature of hundreds of thousands of pounds and in the case of diesel engines, involves equipment which is of such extremely limited vertical clearance and is, relatively to its weight so fragile on the under side that any drop during replacement may result in extensive and expensive damage.

The objects of the invention are to provide devices of the class described which:

Interlock with the rails against lateral displacement and are resistant to longitudinal displacement under load;

Raise the load a minimum amount during rerailing action;

Substantially prevent any disengagement and abrupt drop of a wheel once engaged;

Are adapted for rerailment approach of the wheels from either direction along the track;

Are adapted for engagement by the wheels at varying distances from the rails; and Allow wheels which are on the track rails to pass without derailment, and resist such derailment.

The means by which the foregoing and other objects are accomplished and the method of their accomplishment will readily be understood from the following specification on reference to the accompanying drawings in which.

Figure 1:
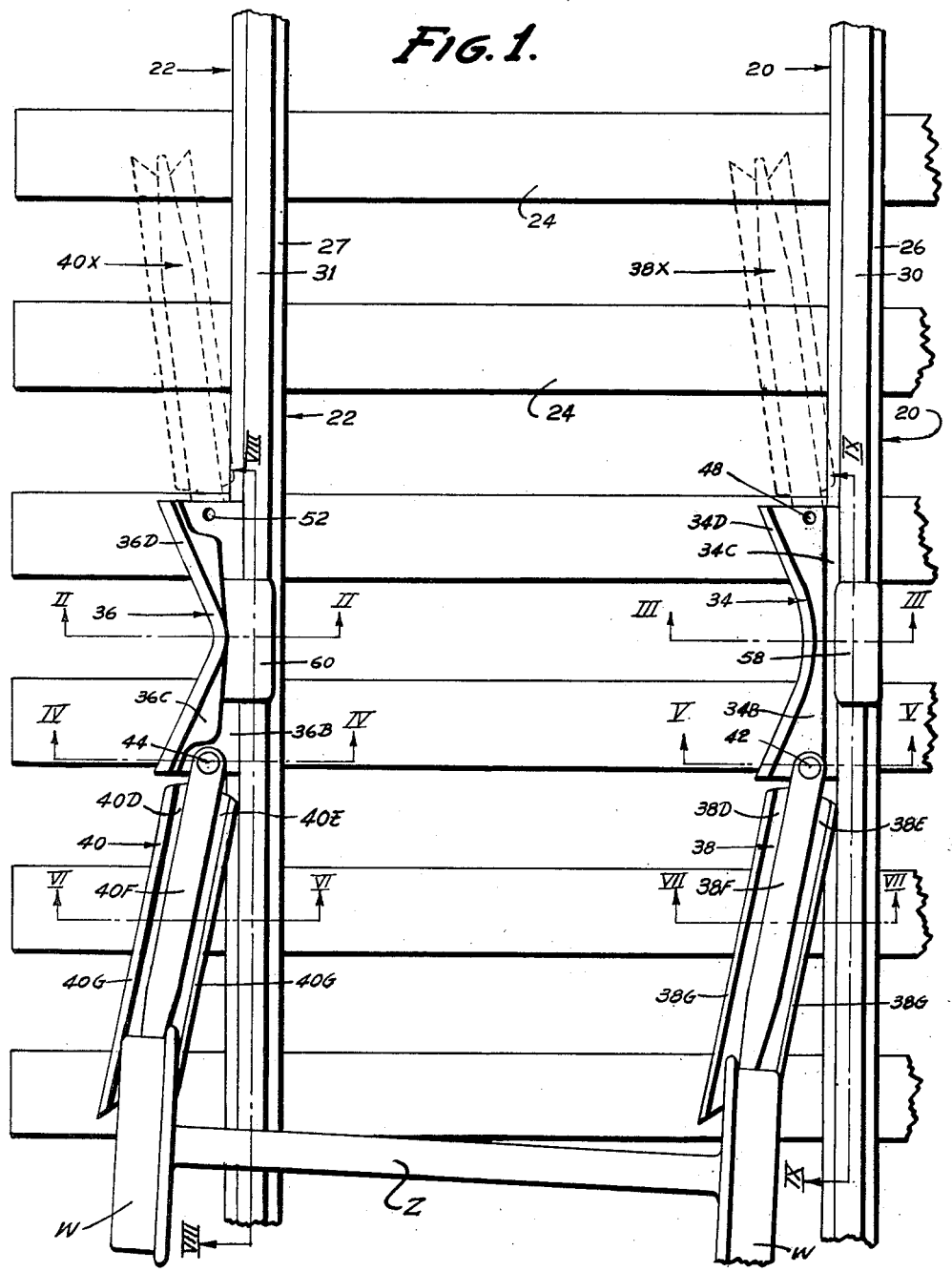
Fig. 1 is a plan view of the rerailer placed for use.
Figure 2:
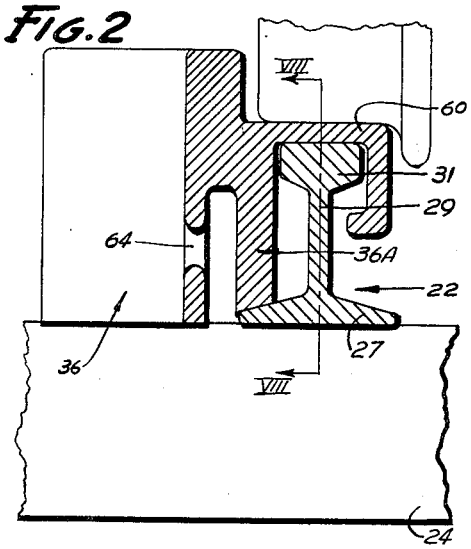
Figs. 2 and 3 are respectively larger scale cross sectional elevational views on the lines II—II and III—III of Fig. 1, of the rail engaging portions of the outer and inner parts of the rerailer.
Figure 3:
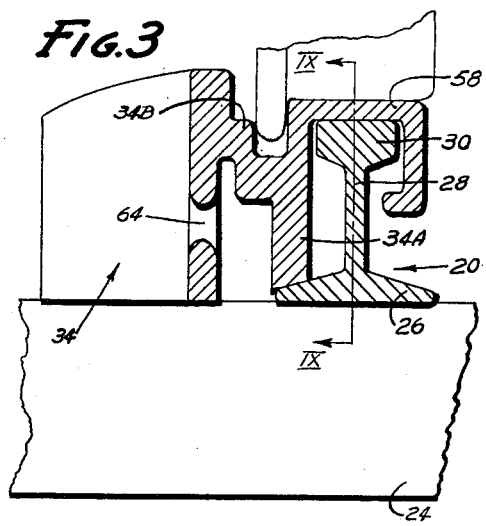
Figure 4:
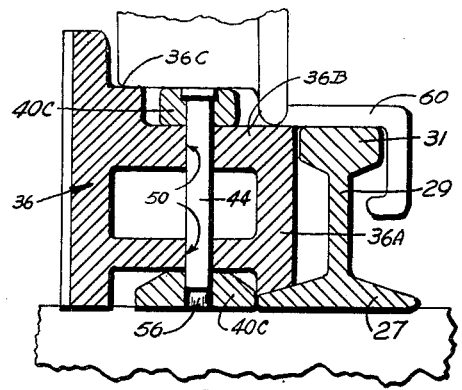
Figs. 4 and 5 are respectively similar scale cross sectional elevational views of the same parts taken on the lines IV—IV and V—V of Fig. 1.
Figure 5:
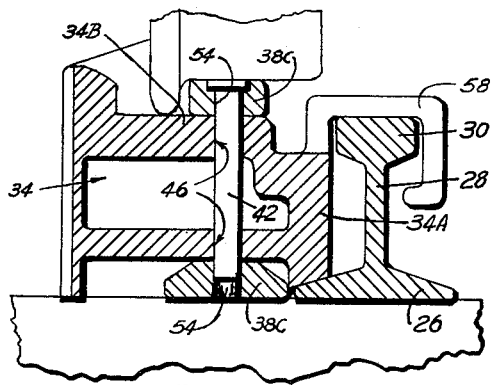
Figure 6:
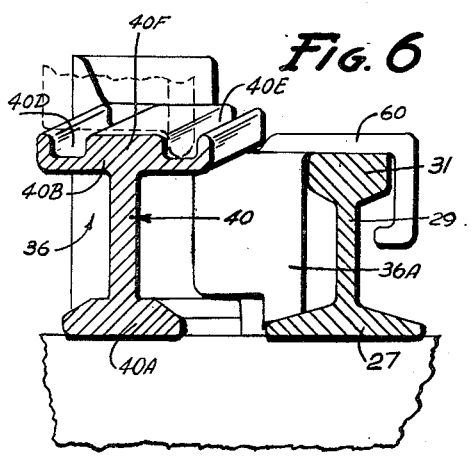
Figs. 6 and 7 are respectively cross sectional elevational views taken on the lines VI—VI and VII—VII of Fig. 1.
Figure 7:
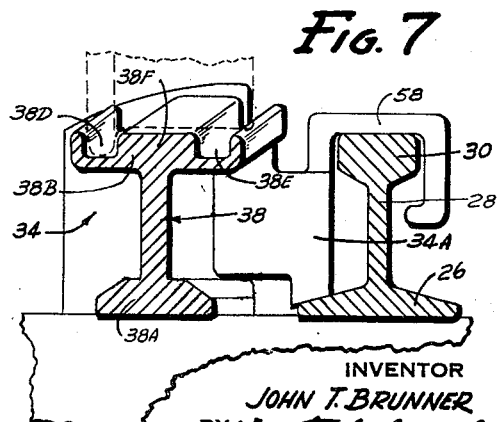

Figs. 8 and 9 are longitudinal sectional elevations of the outer and inner rerailers respectively, taken on the lines VIII—VIII and IX—IX of Figs. 1 and 2 and Figs. 1 and 3.

Referring now to the drawings in which the various parts are designated by numerals, the numerals 20, 22, designate the two track rails and 24 the ties. The rails may be of usual T section with bases 26, 27, stems 28, 29 and heads 30, 31 and may be secured to the ties in any usual or desired manner.

The rerailer comprises complementary wheel rerailer units designated generally by the numerals 34 and 36, the rerailer unit 34 being adapted to lie adjacent the inner side of one of the track rails and the rerailer unit 36 adjacent the outer side of the other rail, the two units being hereinafter respectively designated as inner and outer rerailer units.

The inner and outer units include wheel supporting, guiding and shifting body sections designated respectively by the numerals 34 and 36 which also designate the units generally; approach sections 38, 40, which raise the wheels to the level of the body sections, and vertical hinge pins 42 and 44 through which the approach sections are connected to their respective body sections.

The body sections 34 and 36 are each preferably symmetrical about a transverse plane and of length to overlie two ties of the track and be in part supported thereby, and respectively have hinge pin holes 46, 48 and hinge pin holes 50, 52 in their opposite end portions.

The approach sections 38 and 40 are wedge shaped in longitudinal section, with bases 38A, 40A respectively adapted to lie on and be supported by the ties and tops 38B, 40B diverging upward from the bases toward their pin connected ends.

The deeper end of the approach section 38, has longitudinally extending portions 38C which are provided with holes 54 and are adapted to engage in under and overlying relation with one or the other of the end portions of the body section 34, depending on rerailing conditions to be met, with the holes 54 in alignment with the holes 46, or the holes 48, in the body section 34 and are hingedly secured to the body section, in either case by the hinge pin 42.

The deeper end of the approach section 40 has similarly extending end portions 40C and similar holes 56, in these end portions, and these end portions are similarly engaged in under and overlying relation with the corresponding end portion of the body section 36, and hingedly secured thereto by the pin 44.

It will be understood that the pins are readily removable and that by their removal, and shift of the approach sections to the opposite ends of the body sections as shown in Fig. 1, by the dotted outlines 38X, 40X the device may be readied for use in replacing wheel-axle units which must be approached oppositely to the wheel W of the wheel, axle unit Z shown in the same figure.

The body section 34 of the inner rerailer has an upright side 34A, adapted to lie in the vertical plane of the inner face of the rail head 30 with its top substantially level with the bottom of the rail head, and to extend downward to, and rest on, the base 26 of the rail. Away from the rail the bottom of the body section rests on and is supported by the cross ties.

The body sections are respectively held against displacement away from the rails by plate-like anchor members 58 and 60, the anchor 58 extending upwardly from the top of the side 34A of the body section 34 and then across the tread of the rail 30, and the anchor member 60 directly from the top of the side 36A of the body section 36 across the tread of the rail 31. Both anchor members then extend downward and reversely beneath the opposite sides of their respective rail heads. These anchor members are relatively thin as regards other parts of the body, and parts of the rail, and have a length which may be of the nature of one third the length of the body sections.

The inner rerailer body section 34 has a substantially level wheel flange supporting body portion 34B which is spaced from the anchor member 58 and the rail head 30 slightly in excess of the flange thickness of the wheels W, which are to be rerailed. The top surface of this body portion is substantially level with the top of the rail 30, and is abruptly stepped upward from the top of the side 34A to this level, and with the rail establishes a channelway 34C (Fig. 1) along the inner side of the rail into which the wheel flange is adapted to drop and by which it is retained and guided. Away from the channelway the wheel supporting body portion is flanked by an upstanding flange 34D which at the opposite ends of the body section is spaced from the rail head in excess of the width of the wheel tread and flange and converges from such ends into adjacency with the channelway midway the length of the body section.

The pin connected approach section 38 and 40 leading to the body sections 34 and 36 are constructed for approach use with either end of their related body sections. Both approach sections have spaced parallel channelways 38D, 38E, 40D, 40E respectively in their top portions which are separated by an interposed wheel tread carrier 38F, 40F, and are flanked on their outer sides by flange portions 38G, 40G of tread height. The approach ends of the carriers 38E, 40E are preferably wedge shaped. One of the two grooves of each approach section is used for rerailing approach from one direction and the other of the grooves for rerailing approach from the opposite direction.

Both the body sections and the approach sections are preferably provided with numerous downwardly extending spurs, 62, which effect embedding engagement with the ties and resist displacement of the sections. Hand holes 64 may be provided to aid in placing and removing the body sections.

The outer rerailer 36 has a substantially level wheel flange supporting body portion 36B the top surface of which is level with and a continuation of the top surface of the side 36A and at the level of the top of the rail 31. Outwardly substantially the width of the wheel tread from the remote vertical surface of the anchor 60 the body portion 36B may be stepped abruptly upward of the nature of the depth of the wheel flange to form a wheel tread supporting portion 36C. At opposite ends of the body section this tread supporting portion, if provided, is recessed to receive the end of the upper of the extending portion 40A of the approach section 40. The portion of the body section remote from the rail is additionally provided with an upwardly extending flange 36D coextensive in length with the body section. The rail proximate side of the flange 36D at its opposite ends is spread slightly in excess of the tread width of the wheel from the rail proximate edge of the pivotally attached wheel tread carrier 40F overlying the top portion 36B of the body section, and from its ends converges toward the rail at the center of the body section and is there substantially flush with the rail proximate edge of the body portion 36C.

In the use of the rerailers two ties in adjacency to, but sufficiently in advance of the wheels to be rerailed to allow for installation, are selected, the hook portions 58 and 60 of the body sections 34 and 36 are engaged over the rail heads 30 and 31 respectively and the body sections swung down to seat on the ties with the depending lugs 62 in embedding engagement in the ties. The two approach sections 38 and 40 are brought between the wheels and the proximate ends of the body sections and the projecting ends 38C, 40C of the two approach sections engaged with their respective body sections and secured thereto by the pins 42 and 44. The inner approach section groove 38D, furtherest from the rail 30, is moved into alignment with the flange of the wheel between the rails, and the outer approach section groove 40E adjacent the rail 31 is aligned with the flange of the wheel outside the rails.

The wheels are then pushed or pulled into engagement with the approach sections and ride up the approach sections with the wheels' flanges following the grooves 38D, 40E, until the flanges engage and ride on the tops of the flange supporting body portions 34B and 36B and the wheel tread of the outer wheel on the tread supporting body portion 36C. As the wheels are further advanced the flange of the inner wheel engages the flange 34D of the rerailer body section 34 and is laterally displaced toward the channelway 34C along the rail, and the wheel tread into overlying relation with the top of the rail 30. Concurrently the outer side of the tread of the outer wheel engages the flange 36D of the outer rerailer and is laterally displaced toward the rail onto which the wheel flange almost immediately rolls. Lateral displacement of both wheels continue until the flange of the wheel between the rails drops into the channelway 34C and the flange of the outer wheel drops inside the rail 31 over which it has ridden and the wheels are again on the rails. Thereafter the approach sections 38 and 40 may be shifted into alignment with additional wheels, and their rerailment proceeded with.

Attention is called to the continuous flange groove or channelway 34C along the rail 30 which permits passage of wheels already on the rails without the necessity of removing the rerailing devices.

It will be understood that the raised wheel tread portion 36C of the outer rerailer 36 may be omitted if desired and the flat, flange supporting surface 36B be widened to the flange 36D and entire reliance for wheel support be placed on such flange supporting surface.

It will further be understood that while obviously the rerailers are most advantageously used with rails of some one particular weight and height they may be used with other sizes to which they are not so closely fitted.

It will also be understood that rerailing frogs may be made which involve substantially one half only of the body section and that in such cases the approach sections would require a single groove only in each.

It will further be understood that a pair of single groove approach sections adapted respectively for use with opposite ends of the double end body sections might under some conditions advantageously be provided.

I claim:

1. A rerailing device adapted for use with derailed rolling stock having flanged wheels to replace said rolling stock on rails as of a railroad track, said device consisting of a pair of complementary inner and outer assemblies, each said assembly comprising a body section, said body section including an obliquely angled V-shaped channelway disposed substantially level, means for connecting said body section to the head of a rail, and an inclined approach section, said approach section including an upwardly facing channel-shaped guideway having upstanding side flanges adapted for guiding flanged rolling stock wheels, a wheel tread carrier disposed longitudinally of said approach section between said guideway flanges adapted to support the tread of a flanged wheel, said tread carrier being integrally secured to said approach section and being inclined substantially symmetrically therebetween, the elevated end of said tread carrier extending beyond the elevated end of said guideway and being provided with upper and lower end portions vertically spaced apart; said body section at its opposite ends being provided with end portions of reduced depth relative to said body section, said body section end portions being vertically apertured; said approach section end portions being apertured and embracing one of said body section end portions; and a hinge pin removably seated in the apertures of said one body section end portion and of said embracing approach section end portions, to hingedly and detachably connect said approach section to one end of said body section.

2. A rerailing device adapted for use with derailed rolling stock having flanged wheels to replace said rolling stock on rails as of a railroad track, said device consisting of a pair of complementary inner and outer assemblies, each said assembly comprising a body section, said body section including an obliquely angled V-shaped channelway disposed substantially level, means for connecting said body section to a rail, an inclined approach section, said approach section including an upwardly facing channel-shaped guideway having upstanding side flanges adapted for guiding flanged rolling stock wheels, a wheel-tread carrier disposed longitudinally of said approach section between said guideway flanges adapted to support the tread of a flanged wheel, said tread carrier being integrally secured to said approach section and being inclined substantially symmetrically therewith, the elevated end of said tread carrier extending beyond the elevated end of said guideway and being provided with upper and lower end portions vertically spaced apart; said body section end portions being vertically apertured; said approach section end portions being apertured and embracing one of said body section end portions; and a hinge pin removably seated in the aperture of said one body section end portion and of said embracing approach section end portions, to hingedly and detachably connect said approach section to one end of said body section.

3. A rerailing device adapted for use with derailed rolling stock having flanged wheels to replace said rolling stock on rails as of a railroad track, said device consisting of a pair of complementary inner and outer assemblies, each said assembly comprising a body section, said body section including an obliquely angled V-shaped channelway disposed substantially level, a hook portion integrally connected to said body section including an upper portion adapted to overlie the head of a rail when said device is mounted thereon, said hook portion including a lower flange directed toward said body portion and spaced from said upper portion in excess of the thickness of a rail head; and an inclined approach section, said approach section including an upwardly facing channel-shaped guideway having upstanding side flanges adapted for guiding flanged rolling stock wheels, a wheel-tread carrier disposed longitudinally of said approach section between said guideway flanges adapted to support the tread of a flanged wheel, said tread carrier being integrally secured to said approach section and being inclined substantially symmetrically therewith, the elevated end of said tread carrier extending beyond the elevated end of said guideway and being provided with upper and lower end portions vertically spaced apart; said body section at its opposite ends being provided with end portions of reduced depth relative to said body section, said body section end portions being vertically apertured; said approach section end portions being apertured and embracing one of said body section end portions; and a hinge pin removably seated in the aperture of said one body section end portion and of said embracing approach section end portions, to hingedly and detachably connect said approach section to one end of said body section.

References Cited in the file of this patent

UNITED STATES PATENTS

| Number | Name | Date |
|---|---|---|
| 310,520 | Jones | Jan. 6, 1885 |
| 530,022 | De Bose | Nov. 27, 1894 |
| 607,256 | Maroney | July 12, 1898 |
| 1,106,864 | Desso | Aug. 11, 1914 |
| 1,117,081 | Parker | Nov. 10, 1914 |
| 1,542,737 | Skates | June 16, 1925 |
| 1,827,220 | Bryant | Oct. 13, 1931 |
| 2,429,942 | Nordberg | Oct. 28, 1947 |